United States Patent [19]
Leete

[11] Patent Number: 5,602,990
[45] Date of Patent: Feb. 11, 1997

[54] COMPUTER SYSTEM DIAGNOSTIC TESTING USING HARDWARE ABSTRACTION

[75] Inventor: Brian A. Leete, Portland, Oreg.

[73] Assignee: Pyramid Technology Corporation, San Jose, Calif.

[21] Appl. No.: 511,626

[22] Filed: Aug. 7, 1995

Related U.S. Application Data

[63] Continuation of Ser. No. 95,989, Jul. 23, 1993, abandoned.

[51] Int. Cl.[6] .................................................. G06F 11/00
[52] U.S. Cl. ........................ 395/183.22; 395/183.01; 395/183.06; 364/274.1; 380/25; 380/49
[58] Field of Search ........................ 395/183.22, 183.01, 395/183.06, 183.07; 380/2, 49, 21, 25; 371/8.2; 364/267, 267.4, 274.1, 275.5

[56] References Cited

U.S. PATENT DOCUMENTS

| | | | |
|---|---|---|---|
| 4,729,124 | 3/1988 | Hansel et al. | 371/18 |
| 4,972,453 | 11/1990 | Daniel, III et al. | 371/15.1 |
| 4,982,402 | 1/1991 | Beaven et al. | 371/12 |
| 4,991,174 | 2/1991 | Mori et al. | 371/15.1 |
| 5,005,172 | 4/1991 | Kawamoto | 371/18 |
| 5,006,987 | 4/1991 | Harless | 364/419 |
| 5,068,851 | 11/1991 | Bruckert et al. | 371/16.1 |
| 5,109,381 | 4/1992 | Duxbury et al. | 371/16.5 |
| 5,124,942 | 6/1992 | Nielsen et al. | 364/927.62 |
| 5,251,150 | 10/1993 | Ladner et al. | 364/550 |
| 5,307,456 | 4/1994 | MacKay | 395/154 |
| 5,325,532 | 6/1994 | Crosswy et al. | 395/700 |
| 5,327,435 | 7/1994 | Warchol | 371/16.1 |
| 5,398,333 | 3/1995 | Schieve et al. | 395/575 |
| 5,463,766 | 10/1995 | Schieve et al. | 395/183.12 |

*Primary Examiner*—Robert W. Beausoliel, Jr.
*Assistant Examiner*—Dieu-Minh Le
*Attorney, Agent, or Firm*—Burns, Doane, Swecker & Mathis LLP

[57] ABSTRACT

A user-initiated diagnostic test of a computer system is performed using a hardware abstraction layer including a diagnostic subsystem file and a diagnostic definition file, and also using diagnostic control routines and diagnostic status response routines. A selection is accepted from a user of a diagnostic subsystem to be tested from among a list of diagnostic subsystems stored in the diagnostic subsystem file. In accordance with information stored in the diagnostic definition file, the user is prompted for parameters of the selected diagnostic test, which are accepted from a user. These parameters are passed to the diagnostic control routine, which in response starts the selected diagnostic test. Diagnostic status response information from the diagnostic status response routine is received in the diagnostic control routine. The diagnostic status response information is presented to the user through a hardware-independent mechanism. As a result, user interface and other software at a level above the hardware abstraction layer may be readily migrated to various hardware platforms.

5 Claims, 3 Drawing Sheets

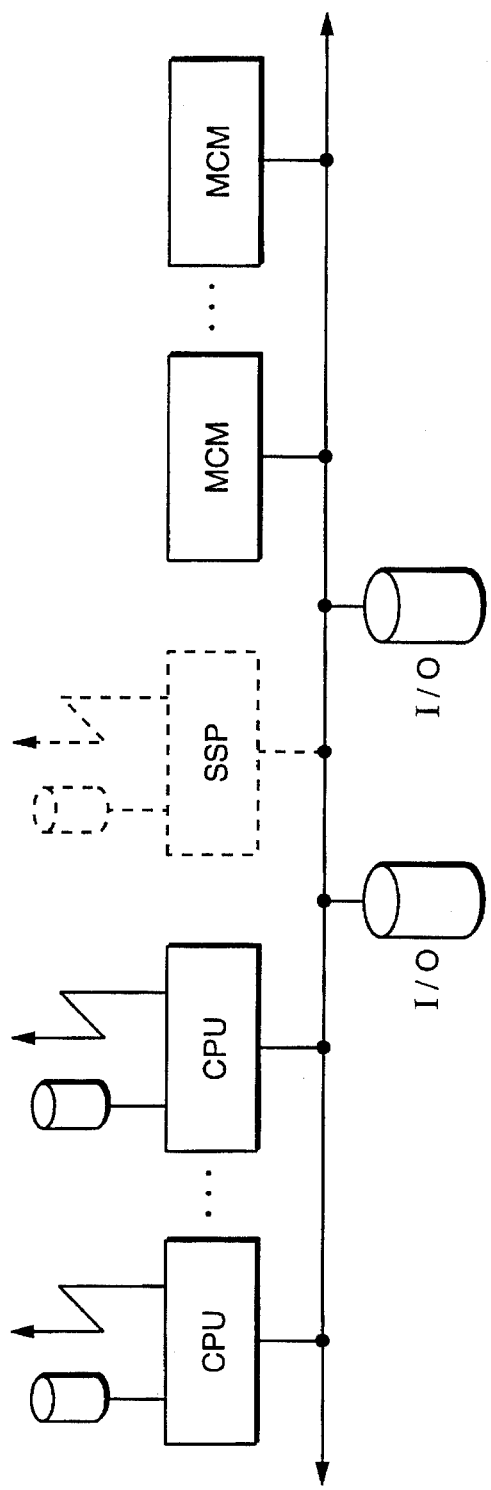
FIG._1
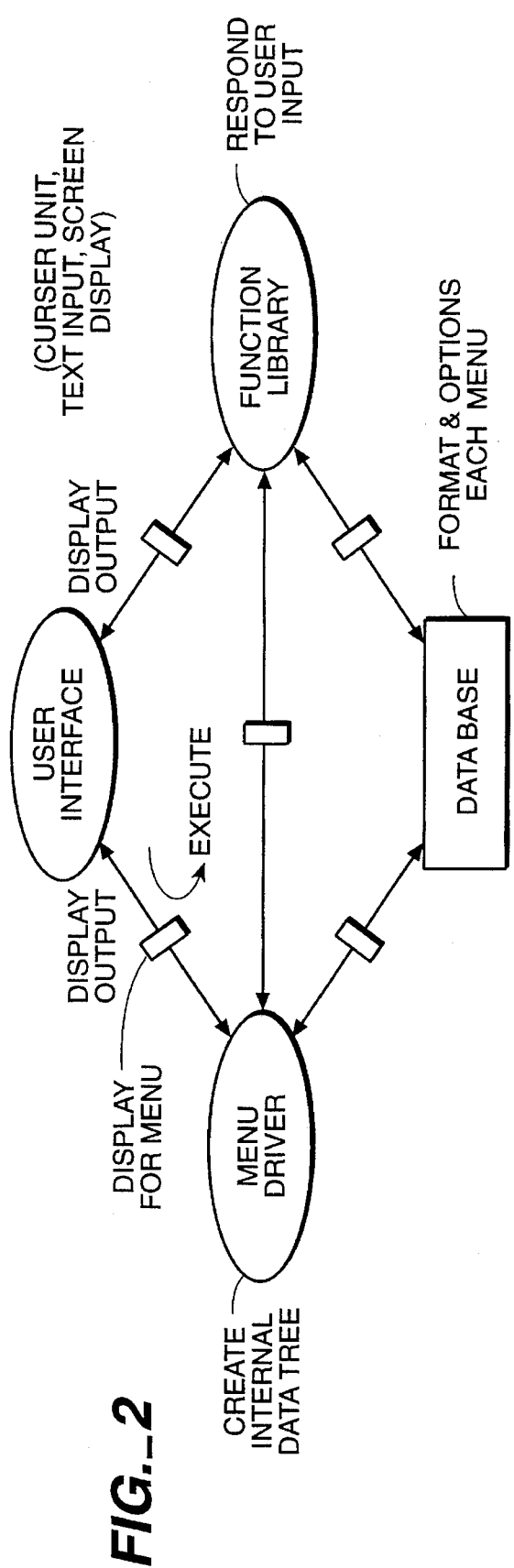
FIG._2

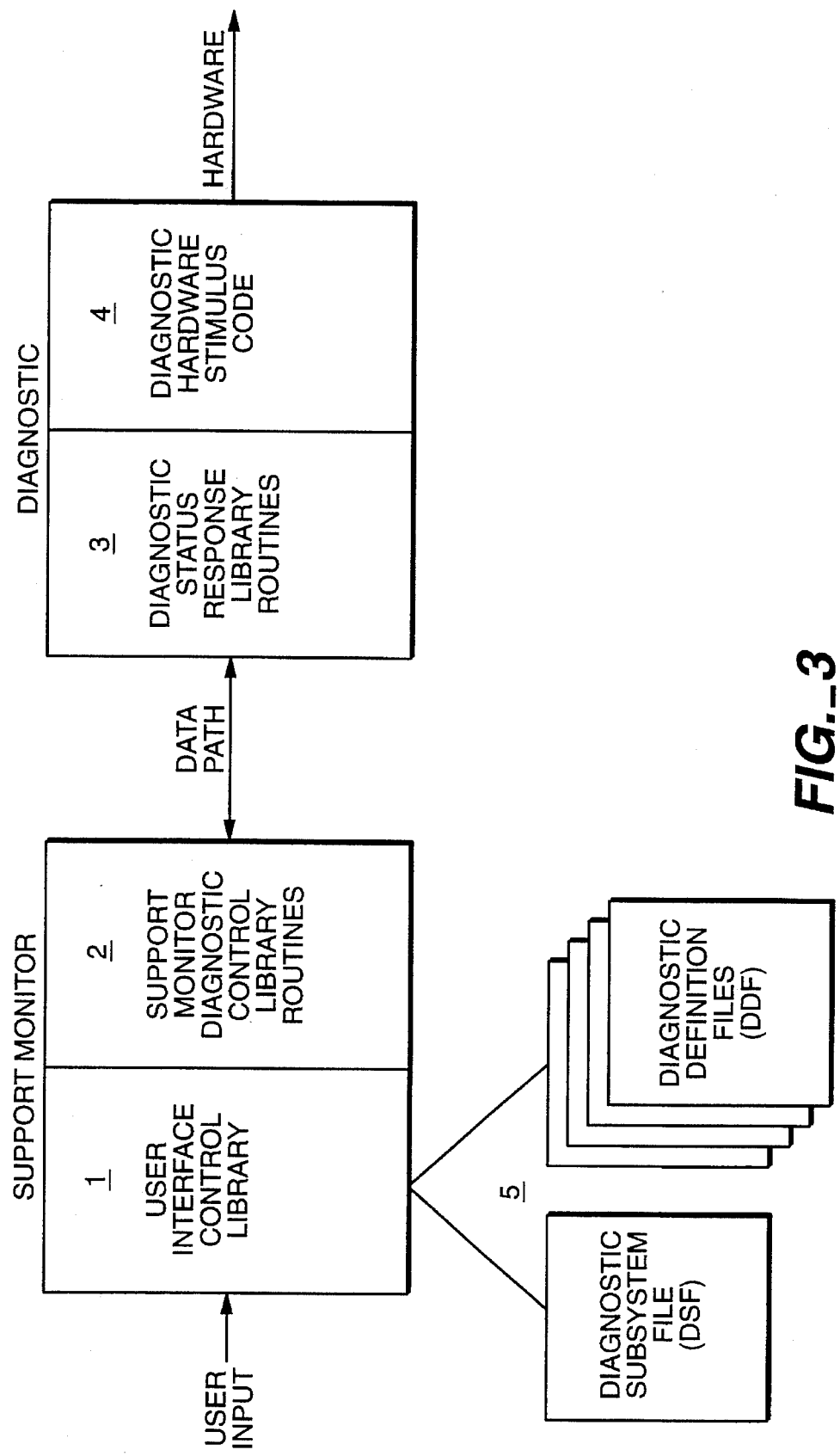
FIG._3

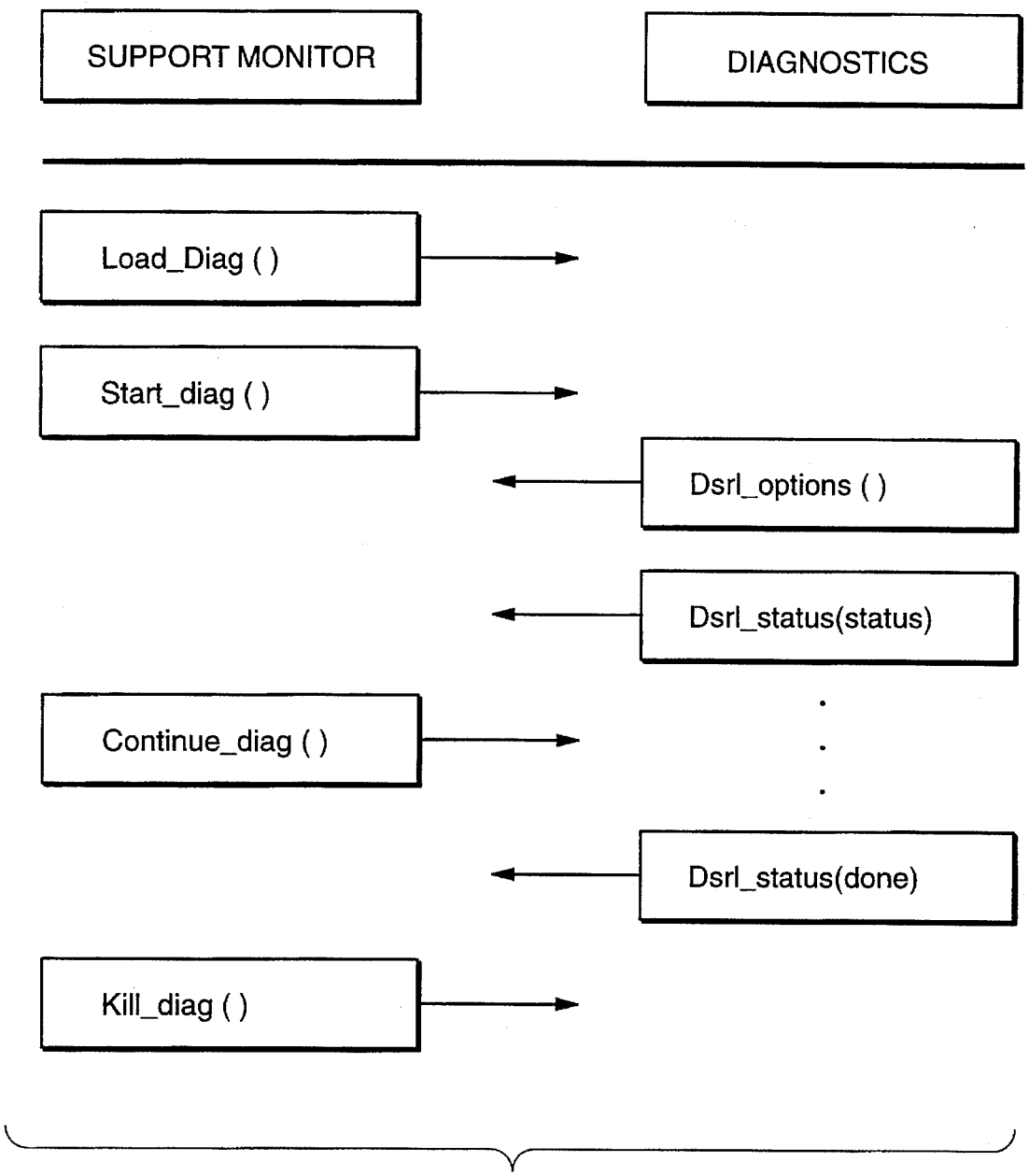
FIG._4

COMPUTER SYSTEM DIAGNOSTIC TESTING USING HARDWARE ABSTRACTION

This application is a continuation of Application Ser. No. 08/095,989, filed Jul. 23, 1993, now abandoned.

BACKGROUND OF THE INVENTION

1. Field of the Invention

The present invention relates to computer system maintenance and diagnostics, and more particularly, to interfacing between controlling software and controlled diagnostic test routines.

2. State of the Art

Much of the world's day-to-day business relies on sophisticated computer systems used in such fields as finance, securities exchange, telecommunications, medicine and retailing. Reliability and maintainability are vital concerns in such applications, since any down time may result not only in tremendous inconvenience but also significant monetary loss. Vendors of such computer systems have, therefore, developed maintenance and diagnostic facilities as part of the computer system. When a system failure occurs, diagnostic software tries to determine the cause of the failure. Diagnostic testing routines specific to various computer subsystems are called by a diagnostic controller in an effort to determine the cause of the failure.

Diagnostics by their very nature are hardware specific. In a known computer diagnostic system, the interface between the diagnostic controller and the diagnostics is defined in a hardware-specific manner using traps. Such a solution is appropriate for a single specific hardware environment, but is not portable to other hardware environments without significant code rework. What is needed, then, is a standard platform interface between the diagnostics and the controlling software, allowing the diagnostics and controlling software to be migrated to various hardware platforms with a minimum of code rework.

SUMMARY OF THE INVENTION

The present invention, generally speaking, provides as part of the maintenance and diagnostic facilities of a computer system a standard, platform-independent interface between the diagnostics and the controlling software, allowing diagnostics and controlling software to be migrated to various hardware platforms with a minimum of code rework.

In particular, in accordance with the present invention, a user-initiated diagnostic test of a computer system is performed using a hardware abstraction layer including a diagnostic subsystem file and a diagnostic description file, and also using diagnostic control routines and diagnostic status routines. A selection is accepted from a user of a diagnostic subsystem to be tested from among a list of diagnostic subsystems stored in the diagnostic subsystem file. In accordance with information stored in the diagnostic definition file, the user is prompted for parameters of the selected diagnostic test, which are accepted from the user. These parameters are passed to the diagnostic control routines, which in response cause the selected diagnostic test to be started. Diagnostic status response information from the diagnostic status response routines are received by the diagnostic control routines. Through the hardware abstraction layer, the diagnostic status response information is presented to the user.

As a result, user interface and other software at a level above the hardware abstraction layer may be readily migrated to various hardware platforms.

BRIEF DESCRIPTION OF THE DRAWINGS

The present invention may be further understood from the following written description in conjunction with the appended drawings. In the drawings:

FIG. 1 is a block diagram of a computer system;

FIG. 2 is a block diagram of the architecture of a Support Monitor that may be used in the computer system of FIG. 1;

FIG. 3 is a block diagram showing in greater detail a Function Library portion of the Support Monitor of FIG. 2, the interface between the Function Library and the diagnostic, and the interface between the diagnostic and the computer hardware; and FIG. 4 is a co-routine diagram illustrating interaction between a hardware abstraction layer of the Support Monitor and the diagnostics.

DETAILED DESCRIPTION OF THE PREFERRED EMBODIMENTS

Referring to FIG. 1, in a typical configuration of a computer of the type described, multiple CPUs and multiple memory modules are connected to a common bus. Also connected to the bus are I/O devices. The system may also include a System Support processor (SSP). In the configuration has shown, each CPU is assumed to be equipped with remote communication facilities and with its own file storage device. Alternatively, if a System Support processor is provided, the System Support processor may be equipped with remote communication facilities and a file storage device, both of which are made available to all the CPUs. The computer system may, for example, be one of the MIS, MIS-S and MIS-T series machines sold by the present assignee.

A Support Monitor allows diagnostic and maintenance functions to be performed in response to user commands. Referring to FIG. 2, the Support Monitor consists of four main components: a general-purpose Menu Driver, a User Interface, a platform-specific Function Library and a Data Base. Because user interface technology is in a state of transition (with X-Windows and other Graphic User Interfaces beginning to become prevalent in the industry), the architecture of the Support Monitor allows user interface technology to be developed independently of the rest of the Support Monitor.

The Menu Driver, the User Interface, and the Function Library, all have well-defined interface routines. The Data Base is a collection of text files (e.g., ASCII text files). The Function Library section of the Support Monitor controls the diagnostics (not shown), which are independent software packages.

In operation, the Menu Driver upon initialization creates an internal data tree with menu configuration and display information found in the Data Base. The Menu Driver calls the User Interface routines to display the first menu. The User Interface routines display the menu information to the user, and in turn, the user responds to the Menu Driver. The Menu Driver then calls the Function Library to execute the selected function, scan the internal data tree to select the next menu and call the User Interface to display the next menu. The Function Library also has access to the User Interface routines and the Data Base files as described in greater detail hereinafter.

The Data Base consists of text files that define the format and options of each displayed menu. In particular, a Diagnostic Subsystem File contains a list of the various subsystems for which diagnostics are available. This file may be used to divide up the list of diagnostics into several different menus or groups. The Diagnostic Subsystem File entries include a text description of the diagnostic subsystem, the relative path name of a Diagnostic Definition File corresponding to the Diagnostic Subsystem File entry, and possible error messages and status messages available to all diagnostics.

For example, the following Diagnostic Subsystem File entry

"Core Subsystem": "cpu/cache":"cpu/cpu"
1:"Core System primary Cache Error =%d"
2:"Core System Secondary Cache Error =%x" defines a subsystem called "Core Subsystem" which includes the diagnostics (and the Diagnostic Definition Files) found in the directories "cpu/cache" and "cpu/cpu". There are two possible error messages, of which the first prints a message with a decimal value and the second displays a message with a hexadecimal value.

Entries in the Diagnostic Definition File contain the file name of the diagnostic, a short text description of the diagnostic, and a hardware system string that identifies to the diagnostic control library which hardware system to load the diagnostic into. Also included are various parameters, including parameters specifying what kind of hardware unit the diagnostic can be loaded into and parameters that specify arguments that the diagnostic may need in order to run. The Support Monitor prompts the user for these parameters when the diagnostic is specified to be executed. A Time Out parameter indicates the longest time in seconds that the diagnostic can be expected to run without the Support Monitor assuming that the diagnostic has hung.

Provision is made for creating a Test Suite Definition File, which contains a diagnostic test suite defined by the user.

A diagnostic Run Log File contains the output (ASCII) of the diagnostic run. The file name of each run is prefixed by the file name of the test suite or the single diagnostic that has been run, followed by a count of the number of times it has been run.

The contents of and command syntax for Data Base files is set forth in detail in Appendix A.

The User Interface section consists of several display routines. Each of these routines displays the output of the Menu Driver and Function Library routines. The User Interface does all of the cursor movement, text input and screen display needed by the Support Monitor. The routines return status when the user has input the required information. When the user desires to execute a diagnostic test, the user makes the corresponding menu selection, in response to which a user interface Execute Diagnostic display is invoked. A list of diagnostics that are available is displayed from which the user may then select the desired diagnostic. As the diagnostic executes, status of the currently executed diagnostic is passed to the User Interface.

A typical diagnostic will include multiple subtests, each of each may include multiple cases. The user may specify what action is to be taken in the event of an error. For example, the user may specify that the diagnostic should ignore the error or that the diagnostic should stop upon occurrence of an error. Alternatively, the user may specify that the diagnostic should be executed repeatedly upon occurrence of an error or that the subtest or case in which the error occurred should be executed repeatedly. Each of these error conditions may be displayed in the Execute Test Suite display during execution of the diagnostic. Status of the diagnostics, such as which portion of the diagnostic is currently executing, may also be displayed. The user may specify that as error messages and status messages are generated, either, neither or both should be displayed.

Routines are provided in the Function Library that respond to user input through the User Interface functions. These routines may be used to get a test suite (by returning a pointer to an object that contains the test entries), run a named diagnostic, load the diagnostic into the specified subsystem and unit, restart the diagnostic at a failing subtest with instructions to loop on the failing case, restart the diagnostic at the failing subtest, restart a diagnostic at the next subtest, or abort the diagnostic. The foregoing user interface routines are set forth in greater detail in Appendix B.

The Function Library contains all of the platform-specific code for the Support Monitor. The function library receives from the User Interface a pointer to a menu entry selected by the User Interface. The Menu Definition File corresponding to the menu entry contains a Function Library argument. This argument is translated into a compiled command in the Function Library.

Referring to FIG. 3, the Function Library is partitioned into two parts, a User Interface Control Library and a Diagnostic Control Library. The User Interface Control Library uses the Diagnostic Control Library to load the diagnostic into the appropriate hardware system, start execution of the diagnostic and record status returned by the diagnostic during execution. The Diagnostic Control Library is linked into the User Interface Control Library.

Using information stored in the Diagnostic Subsystem File and the Diagnostic Definition File, the User Interface Control Library functions as a hardware abstraction layer, hiding details of the system hardware implementation from higher layers, in particular, the User Interface. Accordingly, the same User Interface may be reused for a variety of hardware platforms. Details of the communication from the Support Monitor to the diagnostic are handled by the Diagnostic Control Library routines and are specific to the underlying hardware implementation.

The diagnostic consists of two main parts, Diagnostic Status Response Library routines that interface the diagnostic to the Support Monitor and Diagnostic Hardware Stimulus Code that actually exercises the platform hardware. The Diagnostic Status Response Library consists of routines that allow the diagnostic to pass information to and from the Support Monitor. Handshaking is carried out between the diagnostic and the Support Monitor as shown in FIG. 4. The Load Diagnostic routine loads the executable diagnostic into the appropriate hardware subsystem. The Start Diagnostic routine starts execution of the loaded diagnostic. The Status routine is called by the diagnostic when status messages are to be returned to the Support Monitor. The Status routine notifies the support monitor that the diagnostic has hit a significant milestone, entered a new subtest, and countered an error, or changed its running state. The Kill diagnostic sub-routine stops execution of the currently running diagnostic. The Options routine returns the options that are sent to the diagnostic by the Support Monitor. These options may include the number of times the diagnostic is to be executed, the number of times each test is to be executed, a subtest at which the diagnostic is to begin and a subtest at which the diagnostic is to end.

The Query routine queries the Support Monitor for new run flags. By specifying certain run flags when requesting execution of a diagnostic, the user may specify how error conditions are to be handled. One alternative is for the Diagnostic Status Response Library to query the user upon occurrence of an error for further input as to how to proceed. When queried, the user may decide that further errors should be ignored, or handled in some other way. The user's choice causes new run flags to be returned from the Support Monitor to the diagnostic.

The foregoing has described the interface to the Support Monitor as seen by the diagnostics. Appendices C and D, respectively, provide additional details concerning the Function Library and the Diagnostic Status Response Library. Appendix E sets forth a suggested template for a diagnostic which illustrates the diagnostic/Support Monitor interaction.

The foregoing description has assumed that the diagnostics are off-line diagnostics, i.e., stored on some storage medium. The same approach is also adaptable to built-in self-test routines. Furthermore, the described approach is also applicable to on-line diagnostics, as in the UNIX environment, wherein the interprocess communication facilities provided by UNIX may be used to implement the Diagnostic Control and Status Reponse routines.

The principles, preferred embodiments and modes o operation of the present invention have been described herein. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the present invention as defined by the following claims.

APPENDIX A--DATA BASE FILES

A.1 Command Syntax for Data Base Files

| Symbol | Meaning |
|--------|---------|
| <> | Specifies an individual Command Element. |
| : | Colon separates individual elements on a line. |
| [ ] | Brackets indicate optional items |
| \| | The vertical bar separates optional items, only one of which is used. |
| ... | Three consecutive periods specify that an item may be repeated. |

A.2 Menu Driver Data Files

A.2.1 Menu Definition File (MDF).

The Menu Definition File defines the format and options of the Support Monitor menus and displays. The first Menu Definition file executed by the Support Monitor will have the name main.mdf. Other Menu Definition Files may be of any name but must have a .mdf extension. Menu Definition Files will be of the following format:

<Version Number>:<Menu Title>:<Menu Entry Definitions>

Where <Version Number> is the version number of the file, <Menu Title> is an entry of the form:

<title>:<menu title>:<command>

Where title is a keyword specifying that the rest of the line defines a menu title, <menu title> is a quoted string defining the title of the menu displayed, and <command> is the command line interface name of the menu. <Menu Entry Definitions> are entries of the form:

<display_text>:<command>:<modes>:<function>:<arg_type>[:<parameter n>, ... ]:<default_value>

Where <display_text> is the text to be displayed by the user interface for the specific menu entry, <command> is the command line interface name of the menu entry, <modes> is a comma separated list (SA,CE,SU) of the modes that the command is valid in, <function> is a string passed to the Function Library specifying the function to execute, <arg_type> is a string specifying the type of argument expected, and <parameter n> are optional parameters required by the particular <arg_type>. The default value is initial value of the <arg_type> to be displayed by the Support Monitor.1

-13-

The following table specifies the available arg_types, the function that the arg_type performs, and the type and the number of parameters required.

A.2.2 MDF arg_types and parameters

| Arg_type | Function | Type of Parameters |
|---|---|---|
| Int | Input Variable Decimal Value | Upper and Lower Bound |
| Fixint | Choose Fixed Decimal Integer | List of integers |
| Hex | Input Variable Hexadecimal Value | Upper and Lower Bound |
| FHex | Choose Fixed Hexadecimal Value | List of Hex value |
| Bool | Choose Boolean Value | None |
| Char | Input Character | None |
| Fchar | Choose Fixed Character | List of Characters |
| String | Input Character String | None |
| Fstring | Choose Fixed Char. String | List of strings |
| Menu | Display new Menu | MDF File name |

A.3 Function Library Data Files

A.3.1 Support Monitor State File (SF)

The Support Monitor will create a data file (Support_Monitor.sf) which contains menu option parameter settings to be preserved over a power cycle. Entries will be of the form:

<menu>:<entry>:<value>

Where <menu> is a string corresponding to the command line interface name of the menu which contains the command, <entry> is the command line interface name of the menu entry, and <value> is the value of the specified command.

A.3.2 Diagnostic Subsystem File (DSF).

The Diagnostic Subsystem file contains a list of the various subsystems (defined by the diagnostic designers) for which diagnostics are available. It will have the name Support_Monitor.dsf. The Diagnostic Subsystem File will be of the form:

<Version Number><Diagnostic Subsystem Entries><Global Diagnostic Status and Error Messages>

Where <Version Number> is the version of the file, and <Diagnostic Subsystem Entries> are entries of the form:

<diagnostic subsystem>:<Diagnostic Definition File>[:<Diagnostic Definition File>...]

Where the <diagnostic subsystem> is the text displayed by the Support Monitor, and the ":" is a delimiter separating the two fields. <Diagnostic Definition File> is the relative path name of the Diagnostic Definition File that corresponds to the DSF entry. The diagnostics will reside in the same directory as the Diagnostic Definition File. Each entry is terminated by newline.

<Global Diagnostic Status and Error Messages> are entries of the form:

<error number>:<control string>[:<control string>...]

Where <error number> is a number used by the diagnostics to identify the error message, and <control string> is a standard "C" printf control string to be displayed by the Support Monitor. These messages will be available to all diagnostics.

A.3.3 Diagnostic Definition File (DDF).

The Diagnostic Definition File may be of any name but must have a .ddf extension, and will be of the following form:

<Version Number><Diagnostic Entries>

Where <Diagnostic Entries> are entries of the form:

<Diagnostic Definition Line>[<Diagnostic Status and Error Message>...]

Where <Diagnostic Definition Line> is an entry of the form:

<diagnostic_name>:<text>:<hardware system>:<unit type>: <unit range>: <unit default>:<timeout>[:<arg_type>:<parameters>:<default value>:<text>...]

Where <diagnostic name> is the file name of the diagnostic, <text> contains a short text description of the diagnostic. <Hardware system> is a string that identifies to the diagnostic control library which hardware system to load the diagnostic into. The Unit Type, Unit Range and Unit Default parameters specify what kind of hardware unit the the diagnostic can be loaded into. Valid unit types are: int, fint, hex, fhex. The unit range and unit default specify the valid range and default number of the unit. <Timeout> is the longest time in seconds that the diagnostic can be expected to run without the Support Monitor assuming that the diagnostic has hung. Zero disables the timeout feature for the particular diagnostic. The next parameters are optional and specify arguments that the diagnostic needs to run. The following table displays the argument types available and the parameters they require.

A.3.4 DDF arg_types and parameters

| Arg_type | Function | Type of Parameters |
|---|---|---|
| Int | Input Variable Decimal Value | Upper and Lower Bound |
| Fixint | Choose Fixed Decimal Integer | List of integers |
| Hex | Input Variable Hexadecimal Value | Upper and Lower Bound |
| FHex | Choose Fixed Hexadecimal Value | List of Hex value |
| Bool | Choose Boolean Value | None |
| Char | Input Character | None |
| Fchar | Choose Fixed Character | List of Characters |
| File | Input Optional Diag Data File | File Name |

The <Diagnostic Status and Error Message> entries are of the form:

<error number>:<control string>

Where <error number> is the number of the error message passed to the Support Monitor by the diagnostic, and <control string> is a standard "C" printf control string.

A.3.5 Test Suite Definition File (TSDF).

The Support Monitor will also create a Test Suite Definition File (.tsdf extension) which will contain a diagnostic test suite defined by the user.

The Test Suite Definition File will be of the following form:

<Diagnostic Option Entries><Test Suite Entries>

<Diagnostic Option Entry> is of the form:

<diagnostic_option>:<value>

Where the <diagnostic_option> is a string corresponding to the command line interface name of the diagnostic option in the diagnostic options menu (dcount, scount, etc.) and <value> is the value selected by the user at the time the Test Suite was saved.

<Test Suite Entries> are of the form:

<diagnostic definition file entry> where <diagnostic definition file entry> is the entry taken from the Diagnostic Definition File including the parameters chosen by the user at the time the Test Suite was defined.

A.3.6 Optional Diagnostic Data File (ODDF).

The Optional Diagnostic Data File will have the .oddf extension. The Optional Diagnostic Data File will consist of binary data to be passed to the diagnostic. This information is passed to the diagnostic unaltered by the Support Monitor. It is the responsibility of the diagnostic to interpret this data correctly

A.3.7 Diagnostic Run Log File (DRLF)

The Diagnostic Run Log File will contain the ASCII output of the diagnostic run. The file name of each run log will be of the following form:

test_suite_name.xx.drlf

Where test_suite_name is the file name of the test suite (or single diagnostic) without the .tsdf extension and "xx" is a count of the number of times that the test suite (or single diagnostic) has been run.

A.3.8 Function Library Error Messages File (FLEMF)

The Function Library Error Messages File (Support_Monitor.flemf) will be of the following format:

<Version Number><Error Messages>

Where <Version Number> is the version number of the file and <Error Messages> are error messages that the Support Monitor Function Library can display. <Error Messages> will be of the following format:

<Error Message Number>:<Error Message>

Where <Error Message Number> is a number that is used by the code to specify the error message, and <Error Message> is the text of the error message to display. The error messages will use the standard "C" printf control strings, with variables to be supplied by the Function Library.

A.3.9 Function Library Display Text (FLDT) File

This file (Support_Monitor.fldt) contains all of the display information that the Function Library User Interface routines need to properly format the Function Library displays. It will be of the following format:

<Version Number><Display Text Entries>

Where <Display Text Entries> are of the form:

<Routine Name>:<"Text">[:<"Text">]

Where <Routine Name> is the name of the Function Library routine and <"Text"> is the text to display.

A.3.10 Phone Directory File (phone_list)

This file contains a list of phone numbers stored by the Remote Commnuncations Facility Display. It will be an ASCII file of the following format:

<Descriptive Text>:<Phone Number>

Where <descriptive text> is text describing the phone number, and <phone number> is a phone number of the following form:

<esc>-<id>-<area_code>-<prefix>-<suffix>

Where <esc> is a digit used to escape the local phone network (usually this will be a 9), <id> is the trigger to the long distance carrier (usually this will be a 1), <area_code>, <prefix>, and <suffix> are the actual phone number to dial.

APPENDIX B--USER INTERFACE ROUTINES

B.1 Menu Driver Specific Routines
B.1.1 Interactive Menu Display

The display_menu routine displays a given menu on the screen. This routine is intended to be the main menu display.

```
MenuEntry* display_menu(Menu* request);
```

B.2 Function Library Specific User Interface Routines

These routines will be provided by the User Interface for the Function Library to use.

B.2.1 Error Message Display

```
ui_display_error (const char* error_message)
```

B.2.2 Prompt Display

```
int ui_get_prompt (const char* promptext, IntList*options,
    RANGE | ENUM)
unsigned ui_get_prompt (const char* promptext,HexList*options,
    RANGE | ENUM)
char ui_get_prompt (const char* promptext, CharList* options,
    RANGE | ENUM)
char* ui_get_prompt(const char* promptext, StringList*options,
    RANGE | ENUM)
```

Ui_get_prompt is an overloaded function. IntList, HexList, CharList, and StringList, are lists of integers, unsigned integers, characters, and strings. The last argument in the function specifies whether the list parameter is to be interpreted as a range of values, or as an enumerated type.

B.2.3 Password Display

```
boolean ui_verify_password (const char* password)
char* ui_set_password (const char* oldpassword)
```

Ui_verify_password prompts the user for a password and compares it with the password passed. Ui_set_password prompts for a new password and returns it.

B.2.4 File Browse Display

```
void file_browse()
```

Invokes the file browse display.

B.2.5 Execute Diagnostic Display

```
void ui_execute_diag (DsfList* diag_list)
```

Invokes the user interface execute diagnostic display. DsfList is a linked list of the diagnostics that are available.

B.2.6 Execute Test Suite Display

```
void ui_execute_test_suite(DsfList* diag_list)
```

Invokes the user interface execute test suite display. DsfList is a linked list of the diagnostic that are available

```
void ui_diag_status (timestamp, const char* description,
        error_response, int subtest)
``` ui_diag_status passes status of the currently executing diagnostic to the User Interface. Timestamp is an object with the current time, description is the text description of the status message, error_response is a constant describing the state of the diagnostic and is one of the following: STATUS, COMPLETED, ERR_IGNORE, ERR_STOP, ERR_LOOP_ON_DIAG, ERR_LOOP_ON_SUBTEST, ERR_LOOP_ON_CASE.

B.2.7 Edit Test Suite Display

```
TsdfList* ui_edit_test_suite(DsfList* diag_list)
```

Ui_edit_test_suite invokes the Edit Test Suite display. DsfList is a linked list of all the available diagnostics.

B.2.8 Remote Communications Facility Display

```
void ui_display_rcf (PhoneList* phonelist)
```

Ui_display_rcf invokes the user Interface Remote Communications Facility display.

```
void ui_send_status (const char* status)
```

Allows the Function Library to return status of the send file function to the user interface display

```
void ui_receive_status (const char* status)
```

Allows the Function Library to return status of the receive file function to the User Interface display.

B.2.9 System Configuration Display

```
void display_config(struct config_hdr header,
                    struct config* configuration);
```

This routine will display the current Core System Configuration.

B.3 Function Library Support Routines

B.3.1 File Browse Support Routines

```
char* cat_file(const char* filename)
```

Cat_file opens the file passed and returns a pointer to a character array which holds the data from the file.

```
void delete_file(const char* filename)
```

Delete_file deletes the file from disk.

```
void rename_file(const char* srcfile, const char* destfile)
```
Rename_file renames the src file to the destination file.

```
FileList* get_filelist(const char* dir, const char* filter)
```
Get_filelist takes as an argument a directory and returns a linked list of files from the directory that match the filter.

B.3.2 Execute Test Suite and Diagnostic Support Routines

These routines are provided by the Function Library to support the User Interface Functions

```
TsdfList* fl_get_testsuite(char* filename)
```
fl_get_testsuite opens the file "filename" and returns a pointer to an object that contains the test suite entries.

```
void fl_run_diag(TsdfEntry* diag , int start_subtest,
        int end_subtest)
```
fl_fun_diag runs the named diagnostic.

```
void fl_load_diag(const char* diag_name, const char* hwsys,
        int unit, int subtest)
```
fl_load_diag loads the diagnostic into the specified subsystem and unit.

```
void fl_scope_diag(TsdfEntry* diag, int current_subtest,
        int end_subtest)
```
fl_scope_diag restarts the diagnostic at the failing subtest with instructins to loop on the failing case.

```
void fl_retry_diag(TsdfEntry* diag,
        int current_subtest, int end_subtest)
```
fl_retry_diagnostic restarts the diagnsotic at the failing subtest.

```
void fl_next_subtest(TsdfEntry* diag,
        int current_subtest, int end_subtest)
```
fl_next_subtest restarts a diagnostic at the next subtest.

```
void fl_abort_diag (TsdfEntry* diag,
        int current_subtest, int end_subtest)
```
fl_abort aborts the diagnostic

```
FILE* fl_open_run_log (const char* testSuiteName)
```
fl_open_run_log scans the data directory

```
void fl_close_run_log (FILE* filedescriptor)
```
fl_close_run_log closes the open run log

```
void fl_save_suite (TsdfList* suite, const char* filename)
```
fl_save_suite saves the Diagnostic Test Suite in the file specified by filename

```
TsdfList* fl_get_test_suite (const char* filename)
``` fl_get_test_suite reads the given filename and returns a test suite.

B.3.3 Remote Communications Facility Support Routines

```
void fl_hangup()
```
Terminates the established phone connection.

```
void fl_send_file (const char* srcfile, const char* destfile,
       FUNCTPTR send_status)
```
Sends the named file to the remote system.

```
void fl_abort_send()
```
Terminates the file transfer.

```
void fl_receive_file (const char* srcfile, const char*
       destfile, FUNCTPTR recv_status)
```
Receives a file from the remote system.

```
void fl_abort_receive()
```
Terminates the file transfer

```
void fl_timeout (int seconds)
```
Notifies the Function Library that the time-out value has changed.

APPENDIX C--FUNCTION LIBRARY

C.1 General

The Function Library consists of one routine with the following format:

int execute(MenuEntry* entry_selected);

Where "entry_selected" is a pointer to the MenuEntry selected by the User Interface. The routine returns a non-zero value to signify that the Support Monitor is to terminate.

The Execute routine translates the Function Library argument in the Menu Definition File into a compiled command in the function library.

C.2 State Information

C.2.1 Saveconfig()

The saveconfig() routine saves the selected values of the internal data tree to the Support Monitor State File.

C.2.2 Getconfig()

The getconfig() routine restores the selected values from the Support Monitor State File to the internal data tree.

C.2.3 Restore_state()

The Restore_state routine scans the internal menu data tree and sets all of the values in the menus into hardware. It is used to initialize the Support Monitor hardware to a given state after power up. It will take as an argument a pointer to the first menu in the internal menu data tree.

`error* restore_state(menu* first_menu);`

C.3 Initialization Routines

C.3.1 Load_display_text()

The Load_display_text will load the Function Library Display Text (FLDT) file into memory.

`display_text* load_display(char* filename);`

C.4 Diagnostic Control Library

C.4.1 Load_diag()

The load_diagnostic routine will load the executable diagnostic into the appropriate hardware sub-system.

```
error* load_diag(FILE* diag, char* subsystem, int unit)
```

Where diag is an open file descriptor to the diagnostic executable, subsystem is a string defined in the Diagnostic Definition file which indicates which hardware system to load the diagnostic into, and unit is an integer number designating the unit under test. Load_diag returns a pointer to error return. This routine will block until complete.

C.4.2 Start_diagnostic()

The start_diagnostic routine starts execution of the loaded diagnostic.

```
start_diagnostic(char* diagname, char* subsystem, int unit,
        FUNCTPTR status_routine, struct InitFlags* initflags,
        struct RunFlags* runflags,int arg_array[MAX_ARGS])
```

Where

Diagname is the name of the diagnostic,

Subsystem is the hardware subsystem string defined by the Diagnostic Definition File,

Unit is the unit within the hardware subsystem, and

Status_routine is a pointer to a Support Monitor function to execute when status is returned from the diagnostic.

InitFlags is a structure of the following format:

```
struct Initflags{
        int     diag_count;
        int     test_count;
        int     start_subtest;
        int     end_subtest;
};
```

Where diag_count is the number of times that the diagnostic is to loop before exiting (loop forever = FOREVER), test_count is the number of times each subtest is to execute before proceeding to the next subtest (loop forever = FOREVER),

Start_subtest is the starting subtest, and

End_subtest is the ending subtest.

RunFlags is a structure of the following format:

```
struct RunFlags{
        int     verbosity;
        int     equery;
        int     eresponse;
};
```

Where

*Verbosity* is an enumerated type of ERROR, STATUS, NONE, or BOTH. ERROR instructs the diagnostic to only report error messages. STATUS instructs the diagnostic to report only the status messages, NONE instructs the diagnostic to report no error messages, and BOTH instructs the diagnostic to report both status and error messages.

*Equery* is a flag that instructs the diagnostic to stop and query the diagnostic controller on error.

*Err_response* tells the diagnostic how to handle error conditions. The possibilities are loop on entire diagnostic (ER_LOOPDIAG), loop on subtest (ER_LOOPST), loop on case (ER_LOOPCASE), exit diagnostic (ER_EXIT), and continue (ER_CONTINUE).

*Arg_array* is an array of integers containing the parameters defined by the Diagnostic Definition File.

C.4.3 Status_routine()

This routine will be called when status comes from the executing diagnostic, and will have the following syntax:

```
void status_routine(struct diag_status* status);
```

If the status from the executing diagnostic is zero (meaning request options, see chapter 6) the status routine will call set_options(). If the status is non-zero the status routine will display the status to the user.

C.4.4 Continue_diag

Continue_diag tells the diagnostic to continue after a query, and specifies new run flags. It has the form:

```
continue_diagnostic(char* diagname, char* subsystem, int unit,
     struct RunFlags* runflags)
```

C.4.5 Kill_diag()

This subroutine stops execution of the currently running diagnostic.

```
error* kill_diag(char* subsystem, int unit)
```

Where subsystem defines the hardware subsystem, and unit is the unit within a subsystem.

APPENDIX D--DIAGNOSTIC STATUS RESPONSE LIBRARY

D.1 Dsrl_status()

This routine notifies the Support Monitor that the diagnostic has hit a significant milestone, entered a new subtest, encountered an error, or changed its running state. It is of the form:

```
int dsrl_status(struct diag_status* status);
```

Where diag_status is a pointer to the diag_status structure defined below.

```
struct diag_status{
        char    diagnostic_name[MAX_NAME];
        int     hwsys;
        int     unit;
        int     subtest;
        int     message_type;
        int     messageno;
        int     paramters[4];
        int     total_errors;
};
```

Where

*Diagnostic name* is a null terminated string containing the diagnostic name,

*Hwsys* is the hardware system that the diagnostic is running in,

*Unit* is the unit that the diagnostic is running in,

*Sub test* is the sub test that the diagnostic is running,

*Message type* is the type of message passed back to the Support Monitor and is one of STATUS, ERROR, or STATE,

*Messageno* is the number of the message to be returned,

*Parameters* are the parameters associated with the message,

*Total_Errors* is the total number of errors detected during the execution of the diagnostic. If more errors occur than the Total Errors Detected field can handle, the total errors detected will be set to 0xFFFFFFFF and will stop incrementing.

dsrl_status returns a non-zero value when an error transferring data to the Support Monitor is detected. Usually the diagnostic will abort on detection of an error.

The diagnostic will be required to call dsrl_status at the following events:

- At the start of a diagnostic
- At the start of sub-test
- When an error is encountered (only once in a case loop)
- Before the diagnostic terminates
- Each time the runflags are altered by the diag query.

D.2 Dsrl_options()

The dsrl_options routine returns the options that are sent to the diagnostic by the Support Monitor.

```
int dsrl_options(struct InitFlags* initflags,struct RunFlags* runflags);
``` dsrl_options() takes as arguments pointers to a structures defined in the Support Monitor diagnostic communication start_diagnostic routine. Under normal operations the diagnostic will start execution, pass back a state of DIAG_OPTIONS indicating it is waiting for option input and call the get options routine. The dsrl_options routine will block until options are received from the Support Monitor.

0.0.1 Dsrl_query()

The dsrl_query routine queries the Support Monitor for new run flags. it has the following form:

```
int dsrl_query( struct RunFlags* runflags )
```

Dsrl_query blocks until new flags are returned from the Support Monitor.

Dsrl_query() returns a non-zero value when an error is detected. Usually the diagnostic will abort on detection of an error.

APPENDIX E--EXAMPLE DIAGNOSTIC

E.1 main.c

```c
#include "diag_flags.h"
#include "diag_state.h"
#include "diag_messages.h"
#include "diag_lib.h"

extern int subtest();

/*
 * This Array contains pointers to all of the subtests in the diagnostic.
 */ typedef int (*FUNCTPTR)();
FUNCTPTR subtest_array[] = {
subtest,
/*
subtest1();
subtest2();
...
subtest99();
*/
0
};

main()
{
        int diag_count;/* Number of times the Diagnostic is to loop on itself */
        int subtest_count;/* Number of times each subtest is to loop on itself */
        int subtest;    /* Currently executing Subtest */
        int result;     /* Result of subtest */
        FUNCTPTR test;  /* pointer to currently executing subtest */ diag_state(DIAG_WAITING_FOR_OPTIONS);    /* required */
        get_options(&runflags, &initflags);      /* required */
        diag_count = initflags.diagcount;
diagstart:
        while(diag_count == FOREVER || diag_count--)
        {
                diag_state(DIAG_STARTED);        /* required */
/*              init_hardware();         */
```

```c
            subtest_count = initflags.stestcount;
            for(subtest = initflags.start_subtest;
    {                   subtest < initflags.end_subtest; subtest++)
                while(subtest_count == FOREVER || subtest_count--)
                {
                    if(subtest_array[subtest] == 0)
                    {
                        diag_message(FATAL_ERROR);/* optional */
                        diag_state(DIAG_EXITING); /* required */
                        exit();
                    }
                    else
                        result = subtest_array[subtest]();

if( result == LOOPING_DIAG)
                    {
                        diag_count = FOREVER;
                        goto diagstart;
                    } if( result == LOOPING_STEST)
                        subtest_count == FOREVER;
                }
            }
    }
    diag_state(DIAG_EXITING);                       /* required */
}
```

E.2 subtestn.c

```c
#include "diag_messages.h"
#include "diag_flags.h"
#include "diag_state.h"
#include "diag_lib.h"

int
subtest()
{
    int error;

int   firstcase;
    int   current_case;
    int   lastcase;

diag_state(SUBTEST_STARTED);/* required */
    for( current_case = firstcase; current_case != lastcase; /* inc in
    {                                                           CONTINUE */ )
        diag_message(CASE_STARTED);/* optional */
```

-28-

```
                error = do_case();
                if(error)
                {
                        diag_error(ERROR_MESSAGE /* , optional parameters */ );
                        if(runflags.equery == EQ_YES)
                                diag_query(&runflags);
                        switch (runflags.errresp)
                        {
                                case ER_LOOPDIAG:
                                        diag_state(LOOPING_DIAG);/* required */
                                        return(diagstatus.state);

case ER_LOOPST:
                                        diag_state(LOOPING_STEST);/* required */
                                        return(diagstatus.state);

case ER_LOOPCASE:
                                        /* if we are in a scope loop do not report state
*/
                                        if((equery == EQ_NO) &&
                                                (diagstate.state != LOOPING_CASE))
                                                diag_state(LOOPING_CASE);/* required */
                                        break;

case ER_EXIT:
                                        diag_state(DIAG_EXITING);/* required */
                                        exit();

case ER_CONTINUE:
                                        diag_state(DIAG_CONTINUING);/* required */
                                        current_case++;
                                        break;

default:
                                        /* hideously horrible fatal error */
                                        diag_message(FATAL_ERROR);/* optional */
                                        diag_state(DIAG_EXITING);/* required */
                                        exit();
                        }
                }
        }
}
```

E.3 diag_lib.c

```
#include "diag_lib.h"
#include "diag_flags.h"
#include "diag_state.h"

/*
 * These are library routines that should be available to all diagnostics
```

```
     */
    struct DiagStatus     diagstatus;
    struct InitFlags      initflags;
    struct RunFlags       runflags;

/*
     * Report a status message from the diagnostic.
     */ void
    diag_message( status, param0, param1, param2, param3)
    int status;
    int param0;
    int param1;
    int param2;
    int param3;
    {
        if((runflags.verbosity == V_STATUS) || (runflags.verbosity == V_BOTH))
        {
            diagstatus.message_type = MT_STATUS;
            diagstatus.messageno = status;
            diagstatus.parameters[0] = param0;
            diagstatus.parameters[1] = param1;
            diagstatus.parameters[2] = param2;
            diagstatus.parameters[3] = param3;
            if(dsrl_status(&diagstatus))
                diag_exit();
        }
        else
            return;
    }

/*
     * Report an error message from the diagnostic.
     */ void
    diag_error( error, param0, param1, param2, param3 )
    int error;
    int param0;
    int param1;
    int param2;
    int param3;
    {
        if(diagstatus.total_errors != MAX_ERRORS)
            diagstatus.total_errors++;

if((runflags.verbosity == V_ERROR) || (runflags.verbosity == V_BOTH))
        {
            diagstatus.message_type = MT_ERROR;
```

```
                diagstatus.messageno = error;
                diagstatus.parameters[0] = param0;
                diagstatus.parameters[1] = param1;
                diagstatus.parameters[2] = param2;
                diagstatus.parameters[3] = param3;
                if(dsrl_status(&diagstatus))
                        diag_exit();
        }
        else
                return;
}

/*
 * report state of the diagnostic to the Support Monitor
 */ void
diag_state( state, parameter)
int state;
int parameter;
{
        diagstatus.message_type = MT_STATE;
        diagstatus.messageno = state;
        diagstatus.parameter[0] = parameter;
        diagstatus.parameter[1] = 0;
        diagstatus.parameter[2] = 0;
        diagstatus.parameter[3] = 0;

if(dsrl_status(&diagstatus))
                diag_exit();
}

/*
 * Query diag controller for new run flags.
 */ void
diag_query(runflags)
struct RunFlags* runflags;
{
        dsrl_query(runflags);
}

/*
 * Get initial options from Support Monitor.
 */ void
get_options(countflags, runflags)
struct CountFlags* countflags;
struct RunFlags* runflags;
```

-31-

```
{
        dsrl_options(countflags, runflags);
}

/*
 * Exit Diagnostic
 */ void
diag_exit()
{
        diag_state(DIAG_EXITING);
        exit();
}
```

E.4 diag_lib.h

```
struct DiagStatus {
        char  diagname[20];    /* diagnostic name */
        int   hwsys;           /* Hardware System */
        int   unit;            /* Unit within hardware System */
        int   subtest;         /* Currently Executing Subsystem */
        int   message_type;    /* Type of message (Status, Error, or State) */
        int   messageno;       /* Message Number*/
        int   parameters[4];   /* Parameters for Status or Error Message */
        int   total_errors;    /* Total Errors detected in diag run */
};

struct InitFlags {
        int diagcount;         /* Number of times to loop on the diag */
        int stestcount;        /* Number of times to loop each subtest */
        int start_subtest;     /* Starting subtest */
        int end_subtest;       /* Ending subtest */
};

struct RunFlags {
        int verbosity;         /* error, status, none, both */
        int equery;            /* yes and no */
        int errresp;           /* various loop flags, exit and continue */
};
```

-32-

What is claimed is:

1. A diagnostic test system for performing off-line testing of a computer system, said diagnostic test comprising:

a graphical user interface;

a suite of diagnostic routines, each diagnostic routine being designed to run on a first specific hardware platform and to exercise specific hardware components within said first specific hardware platform; and a software layer for hiding details of said first specific hardware platform from said graphical user interface, coupled to said graphical user interface through a first defined software interface, and coupled to said suite of diagnostic routines through a second defined software interface, said software layer comprising:

a library of diagnostic control routines including routines for loading a diagnostic, starting a diagnostic, continuing running of a diagnostic, and stopping a diagnostic; and a library of diagnostic response routines including routines for passing messages to the graphical user interface including messages prompting a user to input optional parameters, messages informing the user of the status of the diagnostic while the diagnostic is running and messages informing the user of the completion status of the diagnostic after the diagnostic has finished running;

whereby said graphical user interface may be changed and said suite of diagnostic routines may be changed so as to run on a second specific hardware platform, without changing said first software interface and said second software interface.

2. The apparatus of claim 1, wherein said library of diagnostic control routines further includes routines for instructing the diagnostic to enter one of a plurality of looping modes, including, in decreasing order of length of code executed within the loop: a diagnostic loop, a subtest loop, and a case loop.

3. The apparatus of claim 1, wherein said software layer further comprises a plurality of data files describing the diagnostics to be executed, and specific diagnostic options to be presented to the user, whereby diagnostics can be added, removed and modified by modifying at least one of said plurality of data files without otherwise modifying said diagnostic test system.

4. A method of assembling a diagnostic test system for performing off-line testing of a computer system, comprising the steps of:

providing a graphical user interface and a software layer for hiding detail of a specific hardware platform from said graphical user interface coupled to said graphical user interface through a first defined software interface, said software layer having a second defined software interface; and for each of a plurality of diagnostic routines:

providing code for exercising specific hardware components with said specific hardware platform;

providing code for responding to calls made through said first defined software interface; and providing code for making calls to said graphical user interface through said second defined software interface.

5. A method of assembling a diagnostic test system for performing off-line testing of a computer system, comprising the steps of:

providing a graphical user interface;

providing a library of platform-specific routines to support the graphical user interface;

providing a software layer for hiding details of a specific hardware platform from said graphical user interface, coupled to said graphical user interface through a first defined software interface, said software layer also having a second defined software interface coupled to a series of diagnostic routines exercising specific hardware components within said specific hardware platform;

providing code for responding to calls made to the first defined interface, and for transferring information over a platform over a platform-specific datapath through to the diagnostic routines; and providing code for responding to calls made by the diagnostic routine to the second defined interface over the platform-specific data path to the graphical user interface.

* * * * *